2 Sheets--Sheet 1.

W. B. SHEDD.

Improvement in Machines for Treating Fibrous Plants.

No. 126,337.  Patented April 30, 1872.

Witnesses.  William B. Shedd.
Waldo E. Boardman.  by his Attorney,
Chas. E. Dawson.  Frederick Curtis.

2 Sheets--Sheet 2.

W. B. SHEDD.
Improvement in Machines for Treating Fibrous Plants.
No. 126,337. Patented April 30, 1872.

126,337

UNITED STATES PATENT OFFICE.

WILLIAM B. SHEDD, OF BOSTON, MASSACHUSETTS, ASSIGNOR OF ONE-HALF HIS RIGHT TO WILLIAM C. FAY AND SAMUEL B. HOWE, OF SAME PLACE.

IMPROVEMENT IN MACHINES FOR TREATING FIBROUS PLANTS.

Specification forming part of Letters Patent No. 126,337, dated April 30, 1872.

Be it known that I, WILLIAM B. SHEDD, of Boston, in the county of Suffolk and State of Massachusetts, have made an invention of certain new and useful Improvements in Machines for Cleaning the Fibers of Fibrous Plants; and I hereby declare the following to be a full, clear, and exact description thereof, due reference being had to the accompanying drawing making a part of this specification, and in which—

Figure 1:
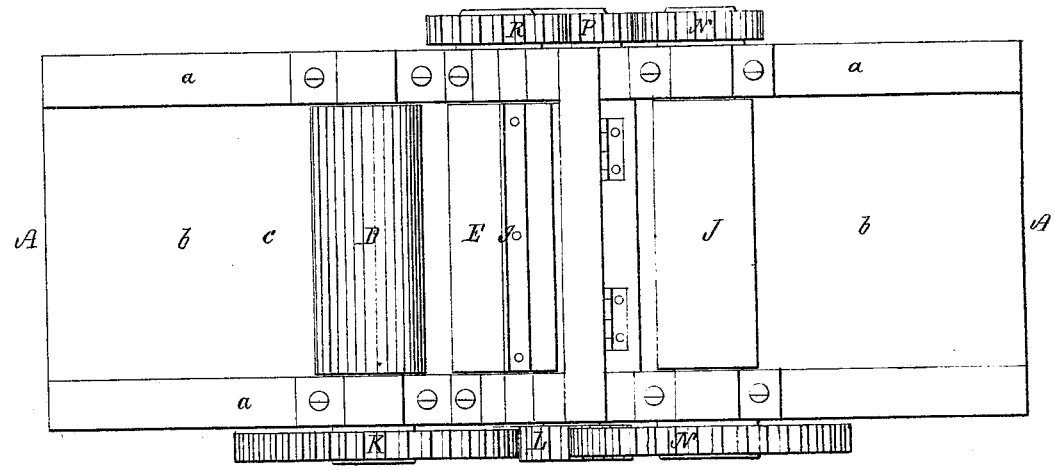
Figure 3:
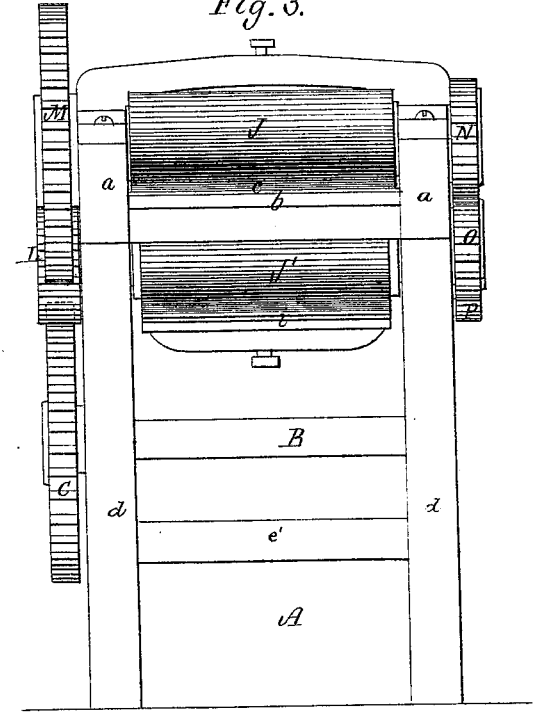
Figure 2:
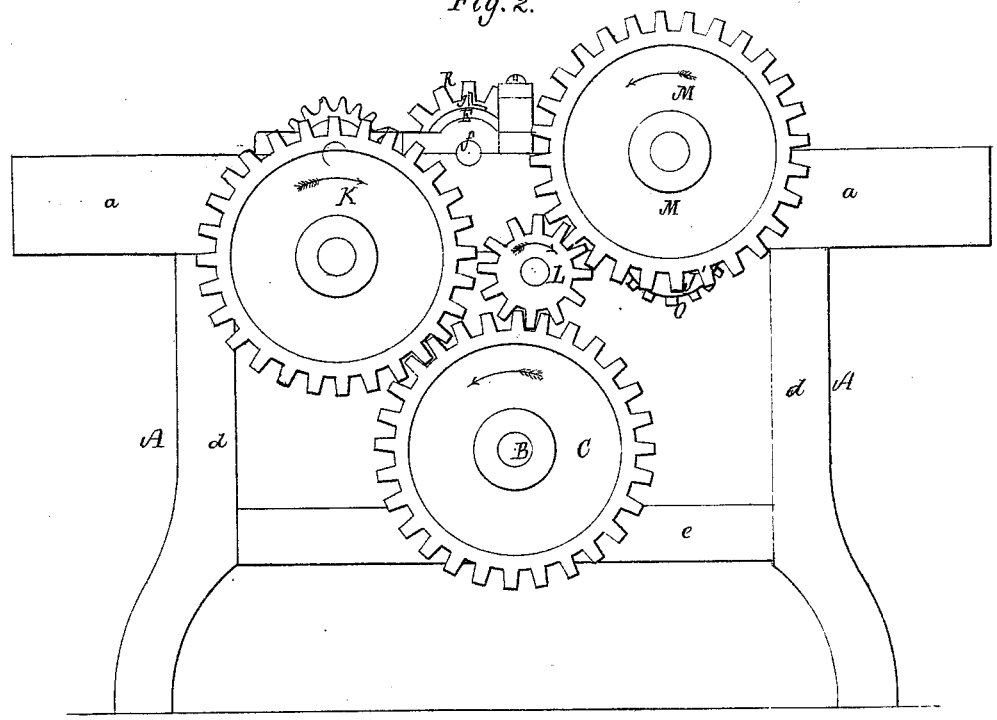
Figure 4:
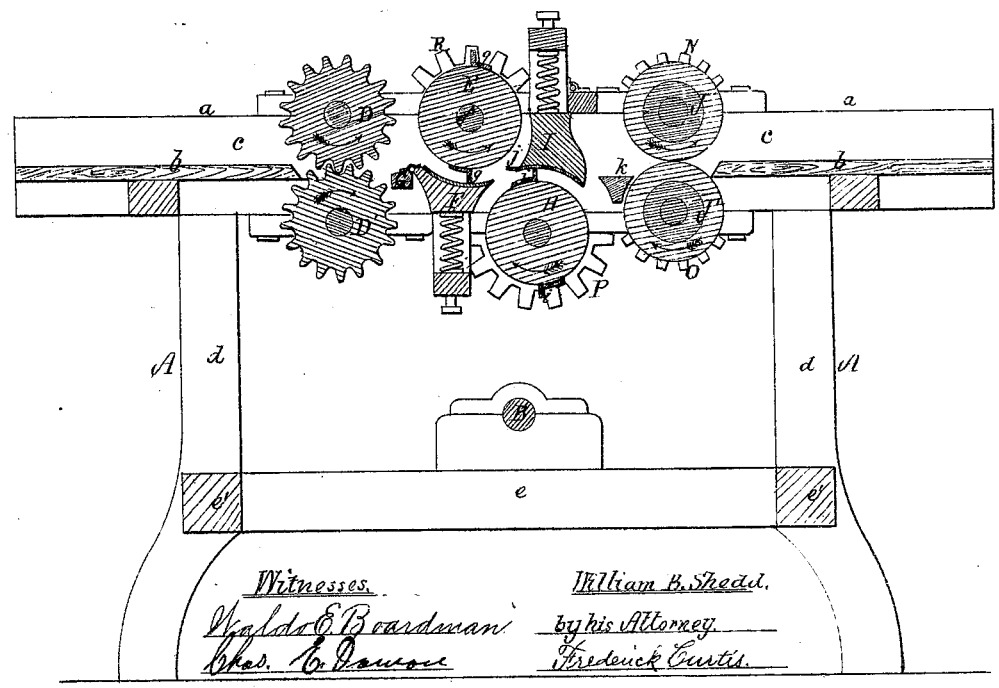

Figure 1 is a plan, Fig. 2 a side elevation, Fig. 3 an end view, and Fig. 4 a vertical and longitudinal section of my machine.

On the 20th day of December, 1870, Letters Patent of the United States numbered 110,237, were issued to Geo. E. Hopkins and myself for improvements in machinery for cleaning Sisal grass and other fibrous plants of the American aloes species in which the fibers are enveloped in a leaf of a crispy, semi-pulpy consistency. In the practical operation of said patented machine, it has been found very effective for treating such leaves as contain a coarse and stout fiber; but its action is too harsh and tearing for certain leaves whose fiber is very fine and attenuated, such as is found in certain South American plants, and in the leaves of the pine-apple family of "*Agave Americana*," and several others. These fibers, whose technical title I am unable to give, being very fine and glossy, closely resembling silk in texture and appearance, render it very desirable to produce a machine which shall separate them from their pulpy envelope without injury, and the machine herein explained has been found to be very effective in producing this result.

The distinguishing feature in this invention is the combination of a concave bed and (revolving above it) a series of knives or scrapers, applied to a suitable cutter-head or cylinder, the surface of the bed being composed of a soft or semi-elastic material, in order that the fibers may not suffer injury in the beating or scraping process which they undergo; while, in addition to this combination of concave bed and revolving knife-studded cylinder, I employ, when necessary or desirable, a pair of fluted, roughened, or elastic rollers, for holding back the leaf while the rotation of the knives scrape the pulp from about the fibers, and lay bare the latter in good order for the next treatment which they undergo. The revolutions of the series of knives acting upon the leaf drag the latter along without other assistance, and, in fact, advance it so fast that, in most instances, a hold-back of some nature is required in order to retain the leaf within the machine a sufficient length of time to undergo an effective treatment.

The drawing accompanying this specification represents at A the frame of my present machine, composed of two upper horizontal rails, $a\ a$, united by a platform, $b$, the three constituting a trough, $c$, the remainder of the machine-frame consisting of four legs, $d\ d\ d\ d$, united by cross-ties or rails $e\ e\ e'\ e'$. The driving-shaft of the machine is shown at B, and is horizontal, and supported in boxes applied to the side rails $e$, the outer extremity of one end of said shaft protruding beyond the rail and carrying a spur-gear, C. D D' in the drawing represent two horizontal, fluted, roughened, or elastic rollers, placed one over the other and revolving in contact, the shafts of these rollers being supported in suitable boxes applied to the side rails $a\ a$ of the machine-frame, the upper roller, D, being above the platform $b$, while its fellow roller, D', is below such platform. E represents a horizontal cylinder, the journals $f f$ of whose shaft revolves in boxes affixed to the upper part of the rails $a\ a$, before named, the periphery of the cylinder being armed with thin steel blades or knives, $g\ g$, &c., arranged about it as shown, while below the cylinder, and spanning the rails $a\ a$, I dispose a horizontal beam or bed, F, whose upper concave surface is a segment of the circle described by the revolving knives $g$, such surface being concentric with the cylinder, and so disposed in relation to the knives that the outer edges of the latter impinge against it, or revolve closely to it, the said surface being of a soft or elastic nature, in order that the fibers passing between it and the knives may not be abraded and flattened. The beam F may be fixed rigidly between the rails $a\ a$, or it may be hinged to a bar, G, disposed in front of it, and, like it, spanning the rails $a\ a$, in order that it may be turned down away from contact with the knives $g$, should occasion require, and it should be provided with a suitable spring, h, to elevate it into its proper position. The cylinder E is parallel to the roller D, and substantially in the same horizontal plane. H, in the drawing, represents a second cylinder, placed below the platform b and slightly in advance of the cylinder E, and, like it, armed with a series of radial or tangential knives, i i, &c., and mounted between the rails a a. This second cylinder, like the first, is combined with a concave beam, I, placed over it and alongside of the cylinder E, the said cylinder H and beam I being counterparts in construction of the two first named. J J' denote two rollers, placed parallel to the cylinders E and H, and in the same horizontal plane with them and the fluted rollers D D', these rollers J J' serving to seize and conduct the mass of fibers as it emerges from between the said cylinders E and H.

The employment of these latter rollers, as well as the first, however, is not compulsory, as they may be omitted, for the reason that the strong current of air generated by the rapid revolution of the cylinders E and H, would suffice, in many instances, to force the leaf along. Nevertheless, as before stated, the fluted rollers D D are useful adjuncts, as, revolving comparatively slowly, they hold back the leaf, and retard its progress sufficiently to permit the knives to act effectively upon it.

Upon one extremity of the shaft of the lower fluted roller D, which, for the purpose of clear elucidation we will call the front, I mount a spur-gear, K, while upon the corresponding or front extremity of the shaft of the cylinder H I mount a pinion, L; upon the front of the shaft of the upper roller J I mount a spur-gear, M; and upon the opposite or rear extremity of the same shaft I mount a pinion, N, which meshes into a second pinion, O, fixed to the adjacent end of the shaft of the lower roller J'. Upon the rear extremity of the shaft of the cylinder H I mount a pinion, P, which engages with a pinion, R, mounted upon the adjacent end of the shaft of the cylinder E.

The gear C, which is mounted upon the driving-shaft B, revolves in the direction of the arrow thereupon, and drives the gear K and roller D, as well as the pinion L and cylinder H, while the pinion L drives the gear M and roller J. The pinion N, being driven by the roller J, drives the pinion O and lower roller J', while the pinion P, driven by the cylinder H, drives, in its turn, the pinion R and the upper cylinder E. The rollers D and J and the cylinder E all revolve in a uniform direction, as indicated by their arrows, while the rollers D' and J' and cylinder H revolve in a uniform but opposite direction, as shown, also, by their arrows.

The rollers D D' and J J', if they are employed, should be driven at the same rate of speed, while the cylinders E and H should be driven at a much greater, but not necessarily the same rate of speed.

Upon the lower front corner of the beam I, I affix a flexible flap or lip, j, which intercepts the path traveled by the knives g, and serves to prevent the fibers from being carried around by the current of air induced by the revolution of such knives, while between the cylinder H and roller, and parallel thereto, I interpose a bar or deflector, k, which spans the rails a a.

The action of the machine is as follows: If the rollers D D' are employed, the leaf to be treated is inserted between them and advanced by them slowly to the action of the knives of the cylinder E, and the action of the rollers D D' may be such as to mangle and soften the pulp of the leaf or not, according to circumstances; but it will not in any instance, probably, be necessary, and the main purpose of the rollers is to exert a hold upon the leaf and feed it to the cylinders E and H, or to others if more are employed. As the leaf proceeds and approaches the cylinder E, the strong blast of air caused by the knives of the latter seizes and impels forward the leaf, and drags it between such revolving knife and the concave bed F, the effect of which is to partially or entirely remove the pulp from about the fibers by a combined beating and scraping action, the fibers passing from the cylinder toward and being seized by the blast induced by the rotation of the cylinder H, the action of the latter cylinder in conjunction with the concave bed I serving to completely remove from the mass of fibers any pulpy, glutinous, or gummy matter which the first cylinder did not remove, and deposit upon the platform b the mass of fibers in a straight parallel state, and in a clean condition.

The knives or blades g or i may be disposed obliquely or spirally about the periphery of their cylinders, should this be found desirable, and the sizes of the various gears and pinions herein named may be changed according to the various speeds desired, or may be omitted altogether and belts and pulleys wholly or in part substituted.

Although I have shown herein two armed cylinders, E and H, only one may be found necessary; or, more than two may be desirable, and I do not confine myself to number or disposition, as these may be varied to suit circumstances or convenience. So with regard to the fluted rollers D D'; some other device may be substituted for them which will exert a certain drag upon the leaf, since this is the principal office performed by them, which becomes necessary from the fact that I drive the cylinders E and H at a very high rate of speed in order to obtain the best results.

Concerning the character of the concave beds F and I, I would remark that they should be of a comparatively soft material, in order, as before stated, not to injure the fibers. In the machine I now have in use, pine wood has been employed. India rubber, either alone or in combination with some other substance, may be employed to advantage.

In machinery for treating fibrous plants for the purpose of extracting and cleaning the fibers therein contained, I claim—

1. The combination, substantially as described, of one or more armed cylinders with corresponding elastic or yielding concave bed or beds, operating together substantially in the manner shown and set forth.

2. I claim, in machinery for treating fibrous plants, the combination of one or more pairs of fluted rollers with the armed cylinder and concave bed, for purposes stated.

3. I claim, in combination with an armed cylinder and concave bed, operating as explained, the elastic flap $j$ or its equivalent, substantially as and for the purposes shown and set forth.

4. I claim, in combination, the armed cylinder E or its equivalent, the concave bed F, fluted rollers D D' or their equivalents, and the flap $j$ or its substitute, for purposes stated.

5. I claim the concave beam or bed herein named, hinged or pivoted, substantially as described, to the frame of the machine, and provided with a suitable spring whereby a yielding or elastic bearing is obtained to protect the fibers, substantially as shown and set forth.

WM. B. SHEDD.

Witnesses:
    FRED. CURTIS,
    WALDO E. BOARDMAN.